Feb. 4, 1930.  J. I. MUNCY  1,745,704
BALL AND SOCKET JOINT
Filed July 12, 1926
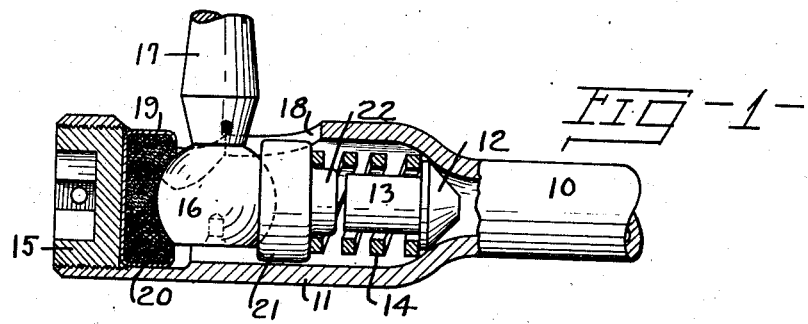
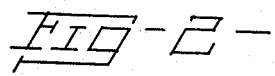
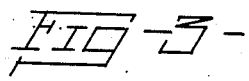
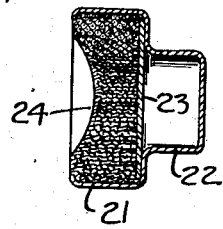
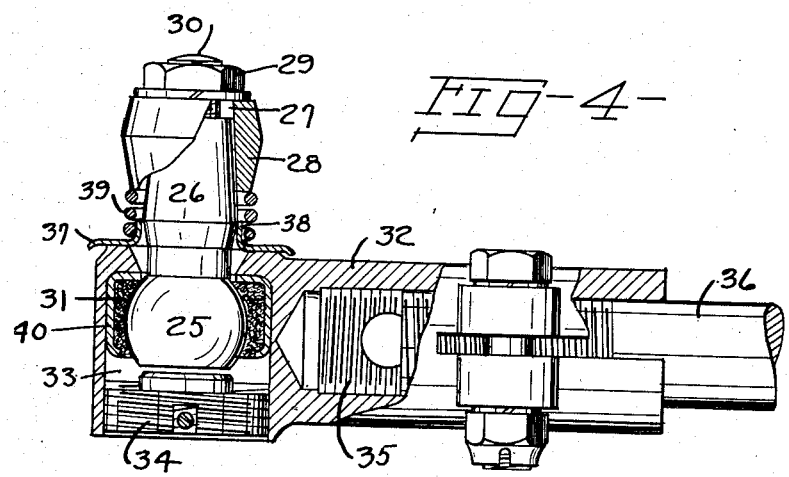
INVENTOR
JOHN I. MUNCY
BY
ATTORNEY Patented Feb. 4, 1930

1,745,704

UNITED STATES PATENT OFFICE

JOHN I. MUNCY, OF DETROIT, MICHIGAN, ASSIGNOR TO THE STUDEBAKER CORPORATION, OF SOUTH BEND, INDIANA, A CORPORATION OF NEW JERSEY

BALL AND SOCKET JOINT

Application filed July 12, 1926. Serial No. 121,880.

This invention relates to ball and socket connections which may be used for drag-links and other articles requiring ball and socket connections, and the principal object is to provide such a connection that will not require lubrication.

Another object is to provide a ball and socket connection in which there is no metal-to-metal contact of the wearing parts.

Another object is to provide a ball and socket connection in which the bearing surfaces of the sockets are formed of a fabric structure.

Another object is to provide a ball socket having a bearing surface formed from fabric impregnated with graphite.

Another object is to provide a ball socket having a bearing surface of fabric composition, preferably reinforced with soft metal threads, in which the threads of the fabric are positioned approximately perpendicular to the wearing surface.

Another object is to provide a ball socket provided with a bearing surface of fabric composition impregnated with graphite, in which the substantial proportion of the threads are positioned perpendicularly to the bearing surface.

Another object is to provide a ball socket comprising a metal shell inclosing a fabric bearing surface, impregnated with graphite.

Another object is to provide a ball socket comprising interconnected cylindrical sheet metal portions of different diameters, a metallic disc being provided to close the opening between said portions, and a fabric bearing element for a ball being received by the larger of said portions.

A further object is to provide a drag link having an enlarged tubular end in which are received two opposed ball socket members provided with bearing surfaces of a fabric composition, a ball being received between said members and being resiliently held in such position.

The above being among the objects of the present invention, the same consists of certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views, Fig. 1 is a longitudinal sectional view taken centrally through one end of an automobile drag-link in which the present invention is incorporated.

Fig. 2 is a longitudinal sectional view taken centrally through the inner ball socket member of Fig. 1.

Fig. 3 is a perspective view of one of the fabric bearing members before compression and machining.

Fig. 4 is a longitudinal sectional view taken centrally through one end of a slightly different construction particularly adaptable to an automobile reach-rod construction.

Heretofore, connections for automobile drag-links, reach-rods, and the like have been made with metal balls and metal ball retaining seats, thus providing a metal-to-metal bearing surface which requires constant lubrication and is conducive to rattling. In motor vehicle work, in which ball and socket connections are usually used in drag-links and reach rods which are subject to much vibration and roadshocks, it is particularly difficult to keep such connections properly lubricated and free of rattles. In addition, when used with the so-called central oiling systems which provide lubricant from a single source for the main bearing points of a motor vehicle chassis, it is impractical to extend the lines of such systems so as to lubricate these connections in drag-links and reach-rods, with the result that these parts become greatly neglected.

The present invention is designed to eliminate the necessity of lubricating these connections without affecting the effectiveness and required smooth working of the same, thus eliminating the heretofore objectionable features of these parts. I do this by employing ball seats having a bearing surface of fabric composition, preferably reinforced with metallic threads, and impregnated with graphite, which forms a dry lubricant. These bearing surfaces do not require lubrication and eliminate the rattles heretofore caused by the metal-to-metal bearing surfaces of these parts.

To illustrate, I show in Fig. 1 a conventional form of an automobile drag-link end to which the present invention is adapted. It comprises a tube 10, which forms the main body portion of the drag-link, having an expanded tubular end portion 11 of larger diameter in which the mechanism for the ball socket is housed. This mechanism comprises a plug 12 which seats against the shoulder formed at the point where the end portion 11 is expanded from the body portion 10, and which is provided with an extended end 13. A coil spring 14 is received within the end 11 and is guided over the end 13 of the plug 12. Two balls seats, incorporating the present invention and to be presently described, and provided with opposed bearing surfaces, are next inserted in the end 11 and are followed by a plug 15 threadably received in and closing the open end of the extended end 11. A ball 16 formed on the end of a shaft 17 is inserted through the opening 18 in the side of the end 11 and positioned between the opposed faces of the ball seats, the plug 15 being screwed up until the spring 14 is compressed, thereby resiliently holding the ball 16 between the ball seats and allowing universal movement of the shaft 17 within the limits of the opening 18.

The ball seats, about which the present invention is drawn are as follows: Referring first to the outer ball seat, shown in section in Fig. 1, a sheet metal cup or shell 19 is shown which encloses the bearing portion proper 20. The bearing portion 20 is composed of fabric, preferably interwoven with soft metallic threads, such as of copper, bronze or the like, and heavily impregnated with graphite, the fabric being so formed that when the bearing portion 20 is completed as many thread ends as possible form the bearing surface of the ball. The bearing portion 20 may be made by taking a strip of fabric as described, interwoven with metallic wires, and impregnated with graphite, and rolling it up into a roll as shown in Fig. 3, and then hydraulically compressing it to form a hard solid body of substantially the size of the finished product, after which any necessary machining may be done on it. It may then be inserted in the shell 19 and the edges of the shell spun over to hold it in place, after which the spherical bearing depression for the ball 16 may be formed in it. The fabric from which the roll shown in Fig. 3 is made up, is preferably of that type in which the majority of the threads are positioned axially of the roll, so that the pressure from the ball from the spring 14 and particularly from the shock transmitted to these parts from the vehicle traveling over the roads, will be taken axially by the threads in the fabric which will thereby be able to withstand the hard use to which it is put for a considerable length of time. In other words, the roll is made up with the warp of the fabric substantially parallel with the axis of the roll, with the filler or woof positioned in a plane substantially perpendicular thereto.

The inner socket member shown in full side view in Fig. 1, and shown in section in Fig. 2, is made similar to the outer socket member except that the shell 21 is formed with a smaller diametered axially projecting shank 22, which acts as a pilot for the forward or outer end of the spring 14. When this shell is formed from a sheet metal stamping as shown, a metal disc such as 23 is preferably inserted over the opening of the shank 22 to provide a backing for the fabric bearing portion 24 which is made in accordance with the bearing portion 20 previously described.

In Fig. 4 is shown the application of this invention to a slightly different form of ball and socket connection such as is often used on reach-rods of motor vehicles. The construction, as shown in Fig. 4 consists of a ball 25 provided with an extending tapered shank 26 which is adapted to be secured in a tapered opening 27 in a bossed end 28 of a lever or other member by means of the nut 29 threadably received on the stud 30 in the end of the shank 26.

The ball 25 rests in a spherical seat 31 positioned in a socket 32, the description of which seat will follow later on. The socket member 32 is provided with an opening 33 perpendicular to its axis, the lower part of the opening being threaded to receive the plug 34, the intermediate portion being formed to receive the spherical seat 31, and the upper portion of which is adapted to allow the shank 26 to pass therethrough and to allow a limited amount of movement thereof about the center of the ball 25 when the latter is properly seated. The socket member 32 is further provided with an axially extending opening 35 which is adapted to threadably receive the end of a rod 36 or the like which is desired to connect to the previously mentioned lever.

A dust cover 37 is provided to prevent dust or other foreign matter from entering the bearing surfaces of the connection through the upper end of the opening 33. This cover is composed of a flat circular sheet metal part having downwardly turned outer edges, and a central opening, the metal of the cover about the center opening being drawn upwardly to form a tubular extension 38 which is adapted to slidably fit around the shank 26, and the flat portion of the dust cover 37 is adapted to seat on the upper surface of the socket member 32 about the opening 33, the downwardly turned edges overlying said upper surface. A coil spring 39 surrounds the shank 26 and is held thereabout under compression between the dust cover 37, seating against the upper face of the socket member 32, and the lower face of the bossed end 28 of the previously mentioned lever. This spring 39 also serves to hold the ball 25 firmly against its seat 31.

The plug 34 which is screwed into the lower part of the opening 33 is to prevent entrance of dust and foreign matter into the bearing surfaces from below and extend up into the opening 33 to within a short distance of the ball 25, but does not, and is not intended to contact therewith, but is only brought up to this point so that in case of breakage of the spring 38, no serious disalignment of the parts will result.

The bearing seat 31, similar to the seats 20 and 21 of Fig. 1 is composed of fabric interwoven with soft metallic threads of copper, bronze, or the like, and heavily impregnated with graphite, it being so formed that the thread ends may form the bearing surface. This seat 31, may be formed, similarly to the seat 20, by rolling the graphite impregnated fabric into the form of a cylinder, the copper threads running lengthwise, thereof, and hydraulically compressing the same into a casing 40 and spinning over the edges thereof which operation forms a hard solid body. The center is then machined out to the shape of the ball 25, to provide the bearing surface for the same with ends of the threads forming for the most part said bearing surfaces, as shown in Fig. 4.

From the foregoing description of the present invention, the objects and advantages are readily apparent and that a bearing for ball-and-socket connections is provided which requires no lubrication but still has the properties of the usual constructions. Formal changes may be made in the specific embodiment of the invention described, without departing from the spirit and substance of the broad invention, the scope of which is commensurate with the appended claims.

What I claim is:

1. In a ball and socket connection, a concave bearing seat for a ball comprising a member formed of compressed woven fabric impregnated with a dry lubricant, a substantial portion of the warp of said fabric being positioned substantially perpendicular to the bearing surface of said seat.

2. A ball socket member formed of compressed woven fabric impregnated with a dry lubricant and provided with a bearing surface formed therein, said surface being angularly disposed relative to the warp of said fabric.

3. A ball socket member comprising a cylindrically shaped member formed of compressed woven fabric impregnated with a lubricant, and a ball seat formed in said member, a substantial number of the warp ends of said fabric being exposed at said ball seat.

4. A ball socket member comprising a cylindrically shaped member formed of a compressed woven fabric impregnated with a lubricant and having a ball seat formed in one end thereof, the warp of said fabric lying parallel to the axis of said member.

5. The method of forming a ball seat for a ball socket comprising arranging a strip of woven fabric to form a solid mass with the warp threads of said fabric parallel to each other, compressing said mass, and forming a depression in said mass angularly disposed with respect to said warp threads.

6. The method of making a bearing member which consists of impregnating a piece of woven fabric with a dry lubricant, rolling said impregnated fabric into a roll of predetermined size with the warp thread thereof extending longitudinally of said roll, compressing said roll to form a solid mass, and forming a spherical seat in the end face of said mass so that the wearing surface of said member is on the ends of said warp threads.

7. The method of making a bearing member which consists of impregnating a piece of woven fabric with a dry lubricant, rolling said impregnated fabric into a roll of predetermined size with the warp of said fabric parallel to the axis of said roll, compressing said roll to form a solid mass, forming a spherical seat in the end of said mass, inserting said member in a metallic shell, and finally deforming the free edge of said shell around the face of said member.

8. The method of making a bearing member for a ball which consists of impregnating a piece of woven fabric with a dry lubricant, rolling said impregnated fabric into a roll of predetermined size with the warp threads of said fabric angularly disposed with respect to the end faces thereof, compressing said roll to form a solid mass, inserting said member in a metallic shell, and finally deforming the free edge of said shell around the end face of said member.

9. The method of making a bearing seat for a ball comprising forming a member from grahpite impregnated woven fabric with the warp threads thereof lying parallel to each other, compressing said member to form a solid mass, and providing a spehrical depression therein the surface of which is angularly disposed with relation to said warp threads.

10. A ball socket member comprising a cylindrically shaped member formed of compressed woven fabric impregnated with a lubricant, metallic threads interwoven in said woven fabric, and a ball seat formed in said member, a substantial number of the warp ends of said fabric and the metallic threads being exposed at said ball seat.

11. A ball socket member comprising a cylindrically shaped member formed of compressed woven fabric impregnated with a lubricant and having a ball seat formed in one end thereof, and metallic threads extending substantially parallel with the warp of said fabric for reinforcing said fabric, the warp of said fabric and said metallic threads lying parallel to the axis of said member.

12. A ball socket member formed of compressed woven fabric impregnated with a dry lubricant and having a bearing surface formed therein, and metallic threads for reinforcing said fabric, said surface being angularly disposed relative to the warp of said fabric and to said metallic threads.

13. A ball socket member formed of compressed woven fabric impregnated with a dry lubricant and having a bearing surface formed therein, and metallic threads for reinforcing said fabric, a substantial portion of the warp of said fabric and said metallic threads being positioned substantially perpendicular to said bearing surface.

Signed my me at Detroit, Michigan, U. S. A., this 7th day of July, 1926.

JOHN I. MUNCY.